(12) United States Patent
Ito et al.

(10) Patent No.: US 7,893,689 B2
(45) Date of Patent: Feb. 22, 2011

(54) DISPLACEMENT MEASURING DEVICE

(75) Inventors: Tomohiro Ito, Kariya (JP); Takamitsu Kubota, Chiryu (JP); Yoshiyuki Kono, Obu (JP)

(73) Assignee: Denso Corporation, Kariya (JP)

( * ) Notice: Subject to any disclaimer, the term of this patent is extended or adjusted under 35 U.S.C. 154(b) by 359 days.

(21) Appl. No.: 12/232,856

(22) Filed: Sep. 25, 2008

(65) Prior Publication Data

US 2009/0091312 A1   Apr. 9, 2009

(30) Foreign Application Priority Data

Oct. 3, 2007   (JP) .............................. 2007-259679
Jan. 15, 2008   (JP) .............................. 2008-005912
Apr. 3, 2008   (JP) .............................. 2008-096763

(51) Int. Cl.
   *G01B 7/14* (2006.01)
(52) U.S. Cl. .................................. 324/207.24; 324/174
(58) Field of Classification Search ......... 324/173–174, 324/207.24–207.26
   See application file for complete search history.

(56) References Cited

U.S. PATENT DOCUMENTS

| 3,060,370 | A | 10/1962 | Varterasian |
| 6,476,600 | B2 | 11/2002 | Kono et al. |
| 6,867,582 | B2 | 3/2005 | Muraji et al. |
| 2006/0113990 | A1 | 6/2006 | Shodlbauer |

FOREIGN PATENT DOCUMENTS

| JP | 02-110815 | 9/1990 |
| JP | 03-44617 | 4/1991 |
| JP | 03-135722 | 6/1991 |
| JP | 04-042016 | 2/1992 |
| JP | 04-78583 | 7/1992 |

(Continued)

OTHER PUBLICATIONS

Partial-Machined English Translation of JP 08-304011 A, Nov. 1996.*

(Continued)

*Primary Examiner*—Bot L LeDynh
(74) *Attorney, Agent, or Firm*—Nixon & Vanderhye PC

(57) ABSTRACT

A displacement measuring device includes a stationary magnetic member for providing an accommodation space and a first and second magnetic circuits, a movable magnetic member disposed in the accommodation space to move in its longitudinal direction, a magnetic sensor for sensing magnetic flux flowing in the first and second magnetic circuits. The stationary member includes a sensor supporting member disposed in line with an axis of symmetry, a pair of yoke members axisymmetrically disposed at opposite sides of the sensor supporting member, a pair of permanent magnets each of which is disposed between one of the yoke members and the sensor supporting member. The permanent magnets are polarized so that magnetic flux flows in one of the magnetic circuits opposite in direction to magnetic flux flowing in the other magnetic circuit. The magnetic sensor is disposed on the sensor supporting member to confront the moving magnetic member at a first air gap. Each of the yoke members has a projection extending in parallel with the longitudinal direction of the movable magnetic member at a second air gap. Therefore, magnetic permeance of the first and second magnetic circuits changes when the moving magnetic member moves in the longitudinal direction thereof.

20 Claims, 6 Drawing Sheets

FOREIGN PATENT DOCUMENTS

| | | |
|---|---|---|
| JP | 04-278415 | 10/1992 |
| JP | 07-318304 | 12/1995 |
| JP | 08-304011 | 11/1996 |
| JP | 9-236644 | 9/1997 |
| JP | 11-346468 | 12/1999 |
| JP | 2003-028605 | 1/2003 |
| JP | 2004-354237 | 12/2004 |

OTHER PUBLICATIONS

Partial-Machined English Translation of JP 2004-354237 A, Dec. 2004.*

Japanese Office Action dated Dec. 8, 2009, issued in corresponding Japanese Application No. 2008-096763, with English translation.

* cited by examiner

DISPLACEMENT MEASURING DEVICE

CROSS REFERENCE TO RELATED APPLICATION

The present application is based on and claims priority from the following Japanese Patent Applications: 2007-259679, filed Oct. 3, 2007; 2008-5912, filed Jan. 15, 2008; and 2008-96763, filed Apr. 3, 2008, the contents of which are incorporated herein by reference.

BACKGROUND OF THE INVENTION

1. Field of the Invention

The present invention relates to a device for magnetically measuring displacement of a moving object and, particularly, a device that includes a stationary magnet member, a movable magnetic member linked with the moving object, a permanent magnet and a magnetic sensor.

2. Description of the Related Art

JP-A-9-236644 discloses a conventional displacement measuring device, which is shown in FIG. 10 of this application. Such a displacement measuring device includes a stationary magnetic member 101, a movable magnetic member 102, a Hall IC (magnetic sensor) 103, a pair of permanent magnets 111, 112 disposed between the stationary magnetic member 101 and the movable magnetic member 102.

The stationary magnetic member 101 has a central projection (or salient pole) 113c projecting toward the movable magnetic member 102, a pair of side projections (or salient poles) 113s projecting toward the movable magnetic member 102 at opposite sides thereof and yoke members 101y formed between the central projection 113c and each side projection 113s. The Hall IC 103 is fixed to the central projection 113c so as to sense magnetic flux density of the magnetic flux passing through the central projection 113c. The permanent magnets 111, 112 are respectively fixed to the side projections 113s and polarized in opposite directions to provide magnetic flux respectively flowing from the permanent magnets 111, 112 through a pair of magnetic circuits J1, J2. For example, the magnetic circuit J2 includes the right side projections 113s, the right yoke portions 101y, the central projection 113c, the Hall IC 103, a first air gap G1, the movable magnetic member 102 and a second air gap G2. The magnetic circuit J1 also has the same members, portion and gaps.

Therefore, the second air gap G2 changes as the movable magnetic member 102 moves in a direction parallel to longitudinal direction of the stationary magnetic member 101, so that the magnetic flux that flows through the Hall IC 103 also changes.

As a result, the Hall IC 103 provides an output signal that corresponds to the travel distance of the movable magnetic member 102. The magnitude of the output signal of the Hall IC is in inverse proportion to the square of the movable air gap G2 and has no linearity, which may sometimes cause difficulty to control a device of a control system.

Further, if the movable member accidentally moves in a direction perpendicular to the longitudinal direction thereof or normal direction, the fixed gap G1 changes, and the magnetic flux to be sensed by the Hall IC 103 increases or decreases from the normal amount of the magnetic flux. As a result, the output signal of the Hall IC 103 may not indicate an accurate position of displacement.

SUMMARY OF THE INVENTION

Therefore, an object of the invention is to solve the above stated problems.

Another object of the invention is to provide a compact and accurate linear or rotational displacement measuring device.

According to a feature of the invention, a displacement measuring device includes a movable magnetic member disposed in an accommodation space (9) having opposite sides extending in parallel with each other and linked with a moving object to move in a longitudinal direction thereof, a magnetic sensor having a sensing surface disposed to confront the moving magnetic member at a first air gap, and an axisymmetric stationary magnetic member for providing the accommodation space. The stationary magnet member includes a sensor supporting member disposed at the center thereof, a pair of yoke members axisymmetrically disposed at opposite sides of the sensor supporting member, a pair of permanent magnets each of which is disposed between one of the yoke members and the sensor supporting member, thereby providing a pair of magnetic circuits and the magnetic sensor. The permanent magnets are polarized so that magnetic flux flows in one of the magnetic circuits opposite in direction to magnetic flux flowing in the other magnetic circuit, and each of the yoke members has a projection extending in parallel with the longitudinal direction of the movable magnetic member at a second air gap so that magnetic permeance of the first and second magnetic circuits changes when the moving magnetic member moves in the longitudinal direction.

Therefore, the voltage signal of the magnetic sensor linearly changes as the movable magnetic member moves in the longitudinal direction. Further, the sum of the first and second air gaps is not changed even if the movable magnetic member shift in the vertical or diametrical direction in the stationary magnetic member. That is, the output voltage signal of the magnetic sensor does not change even if the movable magnetic member shifts in the vertical or diametrical direction.

In the above displacement measuring device, the following features may be added: the projections of the yoke members confront each other so as to partly overlap with the movable magnetic member in the longitudinal direction thereof; the movable magnetic member is disposed to partially overlap with one of the projections; the movable magnetic member includes a non-magnetic member disposed at the central portion thereof so as to magnetically insulate one of the magnetic circuits crossing the movable magnetic member from the other; the magnetic sensor includes a magnetic shoe member to provide a surface that confronts the movable magnetic member at the first air gap, wherein the movable magnetic member has a cylindrical outside surface, and the projection of each of the yoke members has a semi-cylindrical inside surface that confronts the cylindrical outside surface of the movable magnetic member at the second air gap; and the yoke members extend in a circumferential direction, and the movable magnetic member extends in parallel with the yoke members so that a rotational displacement measuring device can be provided.

According to another feature of the invention, a displacement measuring device includes a movable magnetic member linked with a moving object to move in a circumferential direction thereof, a magnetic sensor disposed to confront the moving magnetic member at a first air gap, an axisymmetric stationary magnetic member including a sensor supporting member disposed at the center thereof, a pair of yoke members disposed at opposite sides of the sensor supporting member, a pair of permanent magnets each of which is disposed between one of the yoke members and the sensor supporting member, thereby providing a pair of magnetic circuits each of which crosses the movable magnetic circuit and the magnetic sensor, wherein the permanent magnets are polarized so that magnetic flux flows in one of the magnetic circuits in a direction opposite to magnetic flux flowing in the other magnetic circuit, and each of the yoke members circumferentially extends in parallel with the movable magnetic member at a second air gap so that magnetic permeance of the first and second magnetic circuits changes when the moving magnetic member moves in the circumferential direction.

Further, the following features may be added to the above displacement measuring device: the magnetic sensor includes a magnetic shoe member to provide a surface that confronts the movable magnetic member at the first air gap, the movable magnetic member has a cylindrical outside surface, and the projection of each of the yoke members has a semi-cylindrical inside surface that confronts the cylindrical outside surface of the movable magnetic member at the second air gap; each of the magnetic yokes has a body portion extending in a transverse direction to magnetically connect one of the permanent magnets and one of the projections, and the body portion has a cylindrical inside wall at a portion thereof where one end of the movable magnetic member crosses; and the movable magnetic member includes a pair of cylindrical magnetic members disposed at opposite ends thereof and a cylindrical non-magnetic member disposed between the cylindrical magnetic members.

According to a further feature of the invention, a displacement measuring device includes a stationary magnetic member including a sensor supporting member disposed in line with an axis of symmetry, a pair of yoke members axisymmetrically disposed at opposite sides of the sensor supporting member, a pair of permanent magnets each of which is disposed between one of the yoke members and the sensor supporting member, thereby providing an accommodation space and a pair of magnetic circuits each of which crosses the accommodation space, a movable magnetic member linked with a moving object and disposed in the accommodation space to move in its longitudinal direction, a magnetic sensor disposed on the sensor supporting member to confront a the moving magnetic member at a first air gap, wherein the permanent magnets are polarized so that magnetic flux flows in one of the magnetic circuits in a direction opposite to magnetic flux flowing in the other magnetic circuit, and each of the yoke members has a projection extending in parallel with the longitudinal direction of the movable magnetic member at a second air gap.

In the above displacement measuring device, the magnetic sensor includes a magnetic shoe to provide a surface that confronts the movable magnetic member 1 at the first air gap. Further, the movable magnetic member may have a cylindrical outside surface, and the projection of each of the yoke members has a semi-cylindrical inside surface that confronts the cylindrical outside surface of the movable magnetic member at the second air gap. In addition, each of the magnetic yokes may have a body portion for magnetically connecting one of the permanent magnets and one of the projections, and the body portion may have a cylindrical inside wall at a portion thereof where one end of the movable magnetic member crosses. This provides an additional accommodation space of the movable magnetic member.

According to another further feature of the invention, a displacement measuring device includes an axisymmetric stationary magnetic member for forming a generally rectangular accommodation space having longitudinal opposite ends and opposite sides therein, a magnetic sensor and a linear movable magnetic member linked with a moving object and disposed in the accommodation space so that the movable member can move in its longitudinal direction and in parallel with the sides of the accommodation space.

In the above displacement measuring device, the stationary magnetic member includes the following members:

a sensor supporting member whose center axis being disposed at an axis of symmetry to support the magnetic sensor so that a sensing surface of the magnetic sensor can be disposed at one side of the accommodation space to extend in parallel with longitudinal direction of the movable magnetic member at a first air gap;

a first magnetic circuit member magnetically connected with the sensor supporting member and having a first projection extending from one end of the accommodation space along the opposite side of the accommodation space to be in parallel with the longitudinal direction of movable magnetic member at a second air gap and a first permanent magnet for providing the first magnetic circuit member with magnetic flux flowing in one direction; and a second magnetic circuit member, magnetically connected with the sensor supporting member and having a second projection extending from the other end of the accommodation space along the opposite side of the accommodation space to be in parallel with the longitudinal direction of movable magnetic member at the second air gap and a second permanent magnet for providing the second magnetic circuit member with magnetic flux flowing in the other direction.

Because of the first and second projections has a surface that confronts the movable magnetic member, the surface area changes when the movable magnetic member moves in the longitudinal direction thereof. Therefore, magnetic flux flowing in the first and second magnetic circuit members linearly changes as the movable magnetic member moves in its longitudinal direction. Such a change is detected by the magnetic sensor, whose output voltage is sent to an ECU to measure a displacement of a moving object.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
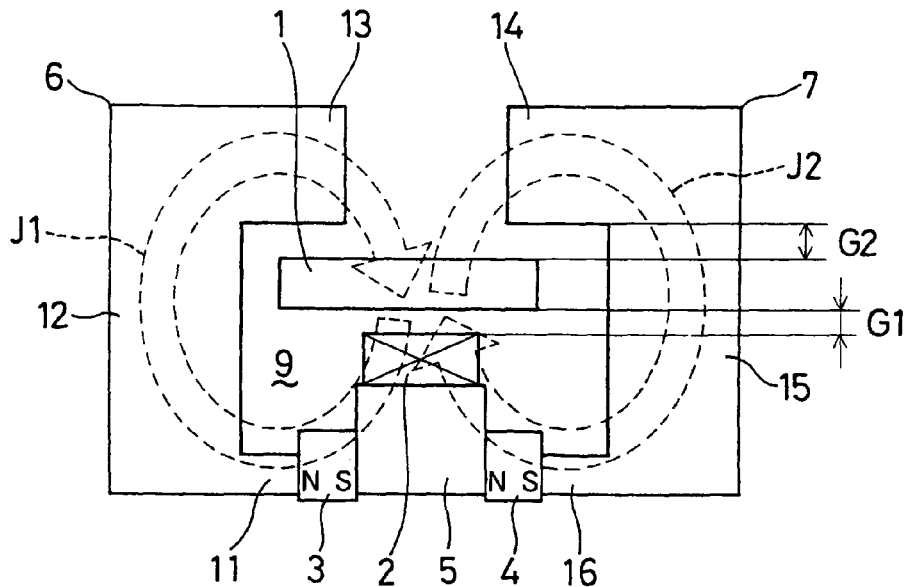
FIG. 1 is a schematic diagram illustrating a linear disposition detecting device according to the first embodiment of the invention.

A linear displacement measuring device according to the first embodiment of the invention will be described with reference to FIGS. 1 and 2.

The linear displacement measuring device according to the first embodiment of the invention is used for measuring linear motion of the control shaft of a valve control mechanism of an engine.

The linear displacement measuring device includes a linear movable magnetic member 1 that is linked with the control shaft to move in the longitudinal direction thereof in an accommodation space 9 thereof, a magnetic sensor 2 that is disposed in the accommodation space 9 to confront the movable magnetic member 1, a pair of generally cubic first and second permanent magnets 3, 4 that is disposed to provide magnetic flux flowing across the movable magnetic member 1 and in magnetic circuits in which the magnetic sensor 2, a sensor supporting block 5 and a pair of first and second yoke members 6, 7 are included.

The movable magnetic member 1 is a long rectangular parallelepiped stick made of magnetic material, such as iron. The magnetic sensor 2 is a Hall IC that includes a Hall element (sensor element) and an amplifying circuit for amplifying the output voltage signal of the Hall element. Each of the first and second permanent magnets 3, 4 is made of samarium-cobalt alloy, neodymium, Alnico, ferrite or the like. The sensor supporting block 5 is also a cubic magnetic member.

The sensor supporting block 5, the first and second yoke members 6, 7, and the permanent magnets 3, 4 form a stationary magnetic member. The sensor supporting block 5 is disposed at the center of the stationary magnetic member to support the magnetic sensor 2 on its surface. Each of the first and second yoke members 6, 7 is a U-shaped magnetic member that has a parallelepiped first projection 13, 14 extending in parallel with the longitudinal direction of the movable magnetic member 1 and a parallelepiped second projection 11, 16 also extending in parallel with the longitudinal direction of the movable magnetic member 1 and a body portion 12, 15 extending in the transversal direction of the movable member 1 to magnetically connects the first and second projections 11-13, 14-16. The first and second yoke members 6, 7 are disposed at opposite sides of the sensor supporting block 5 so that first projections 13, 14 and the second projections 11, 16 respectively confront each other. The stationary magnetic member is formed axisymmetric with respect to the vertical center line of the sensor supporting block 5.

Each of the first and second permanent magnets 3, 4 is disposed between the sensor supporting block 5 and the second projection 11, 16 of one of the yoke members 6, 7 without an air gap. Therefore, the first and second permanent magnets 3, 4 is located nearer to the magnetic sensor 2 than to the movable magnetic member 1.

The movable magnetic member 1 is accommodated in an accommodation space 9 surrounded by the first projections 13, 14, the first and second yoke members 6, 7 and the sensor supporting block 5 to have a generally rectangular cross-section. The movable magnetic member 1 is disposed in the accommodation space so that it can move from the left to the right in the accommodation space shown in FIG. 1 by 8 mm at maximum, for example. For this purpose, one end (e.g. left end) of the movable magnetic member 1 is initially disposed to be closer to the side wall of the body portion of one of the yoke members (i.e. an end of the accommodation space 9 on the side of the first yoke member 6) than the other end. The movable magnetic member 1 is disposed to extend in parallel with the first projections 13, 14 at an air gap G2 so that it partially overlaps with the first projections 13, 14 in the longitudinal direction and to have an air gap G1 between the movable magnetic member 1 and the sensing surface of the magnetic sensor 2. In other words, each of the first and second magnetic circuits J1, J2 includes the first and second air gaps G1, G2, which do not change even when the movable magnetic member 1 moves in the longitudinal direction thereof. However, when the movable magnetic member 1 moves, the magnetic permeance changes because the area of surfaces of the movable magnetic member 1 and the projections 13, 14 that confront each other change.

Accordingly, the stationary magnetic member provides a first magnetic circuit J1 that includes the sensor supporting block 5, the first permanent magnet 3, the first yoke member 6, the second air gap G2, the movable magnetic member 1, the first air gap G1 and the magnetic sensor 2 and a second magnetic circuit J2 that includes the sensor supporting block 5, the second permanent magnet 4, the second yoke member 7, the second air gap G2, the movable magnetic member 1, the first air gap G1 and the magnetic sensor 2.

The first and second permanent magnets 3, 4 are magnetized so that magnetic flux supplied from the first permanent magnets 3 can flow in the first magnetic circuit J1 in a direction opposite to the magnetic flux flowing in the second magnetic circuit J2.

When the movable magnetic member 1 moves in the longitudinal direction thereof as the control shaft of the valve control mechanism moves, the magnetic permeance between the first projections 13, 14 and the movable magnetic member 1 changes, so that the amounts of the magnetic flux flowing in the first and second magnetic circuits J1, J2 change.

Figure 2:
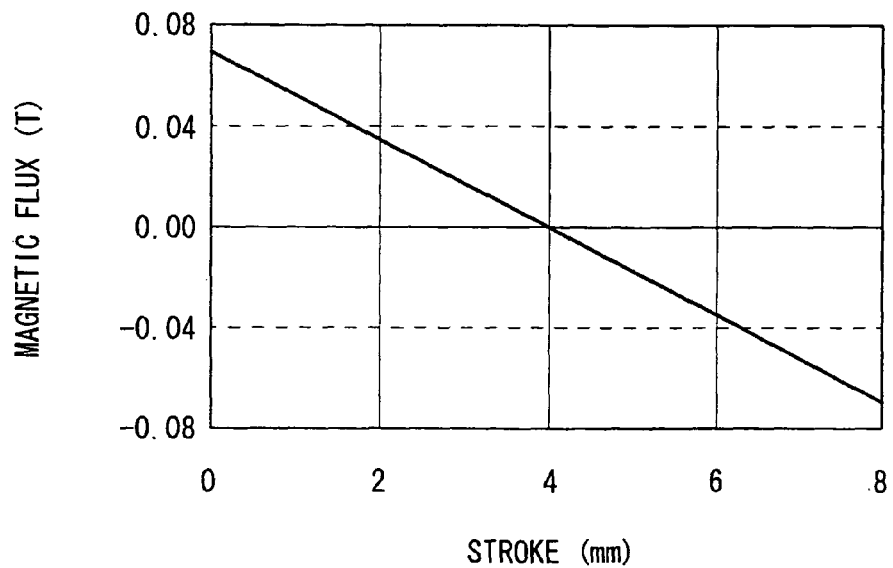
FIG. 2 is a graph showing a relation between the displacement or travel distance of a movable magnetic member and an amount of magnetic flux that passes a Hall IC.

As shown in FIG. 2, the magnetic sensor 2 outputs a voltage signal that corresponds to its maximum amount (e.g. 0.07 Tesla) of the magnetic flux when the movable magnetic member does not move from the position (e.g. 0 mm) shown in FIG. 1. On the other hand, the magnetic sensor 2 outputs a voltage signal that corresponds to its minimum amount (e.g. −0.07 Tesla) of the magnetic flux when the movable magnetic member 1 moves from the position (e.g. 0 mm) shown in FIG. 1 by its maximum stroke (e.g. 8 mm) to the right.

It is noted that the voltage signal linearly changes as the movable magnetic member moves in the longitudinal direction. It is also noted that the sum of the first and second air gaps G1, G2 is not changed even if the movable magnetic member 1 shift in the vertical or diametrical direction in the stationary magnetic member. That is, the output voltage signal of the magnetic sensor 2 does not change even if the movable magnetic member 1 shifts in the vertical or diametrical direction.

The above voltage signal is sent to an ECU, which calculates the displacement of the control shaft and the valve-lift stroke of an engine suction valve in a well-known manner.

A linear displacement measuring device according to the second embodiment of the invention will be described with reference to FIG. 3.

Incidentally, the same reference numeral as the first or a precedent embodiment corresponds to the same or substantially the same portion, part or member thereof hereafter.

The linear displacement measuring device according to the second embodiment of the invention includes a movable magnetic member 1 that is linked with a control shaft moving in the longitudinal direction thereof, a magnetic sensor 2 that is disposed to confront the movable magnetic member 1, a pair of first and second permanent magnets 3, 4 that is disposed to supply magnetic flux to the movable magnetic member 1 and the magnetic sensor 2, a sensor supporting yoke member 5 and a pair of first and second yoke members 6, 7.

The sensor supporting yoke member 5 is an E-shaped magnetic member that has three projections—a center projection 20, a first projection 21 and a second projection 22 and a base portion 19 that extends in parallel with the movable magnetic member 1.

The sensor supporting yoke member 5, the first and second yoke members 6, 7, and the permanent magnets 3, 4 form a stationary magnetic member that has an accommodation space 9 therein. The center projection 20 of the sensor supporting yoke member 5 has a cubic shape that supports the magnetic sensor 2 on its upper surface.

Each of the first and second yoke members 6, 7 is a L-shaped magnetic member that has an first projection 13, 14 extending in parallel with the longitudinal direction of the movable magnetic member 1 and a body portion 12, 15 extending in the transversal direction of the movable member 1. The first and second yoke members 6, 7 are disposed at opposite sides of the sensor supporting block 5 so that the first projections 13, 14 respectively confront each other.

Each of the first and second permanent magnets 3, 4 is disposed between one of the body portions 12, 15 and one of the first and second projections 21, 22 of the sensor supporting yoke member 5 without an air gap. Therefore, the stationary magnetic member is formed symmetric with respect with the vertical center line of the sensor supporting yoke member 5.

The movable magnetic member 1 is accommodated in the accommodation space 9, which is surrounded by the sensor supporting block 5, the first and second yoke members 6, 7. The first and second permanent magnets 3, 4 are magnetized in the same manner as the first embodiment.

Accordingly, the stationary magnetic member provides a first magnetic circuit J1 that includes the center projection 20 and the first projection 21 of the sensor supporting yoke member 5, the first permanent magnet 3, the first yoke member 6, the second air gap G2, the movable magnetic member 1, the first air gap G1 and the magnetic sensor 2 and a second magnetic circuit J2 that includes the second yoke member 7, the second permanent magnet 4, the second projection 22 of the sensor supporting yoke member 5, the center projection 20 and the magnetic sensor 2, the first air gap G1, the movable magnetic member 1, and the second air gap G2.

When the movable magnetic member 1 moves in the longitudinal direction thereof as the control shaft of the valve control mechanism moves, the magnetic permeance between the first projections 13, 14 and the movable magnetic member 1 changes, so that the amounts of the magnetic flux flowing in the first and second magnetic circuits J1, J2 change, in the same manner as the first embodiment.

Figure 4:
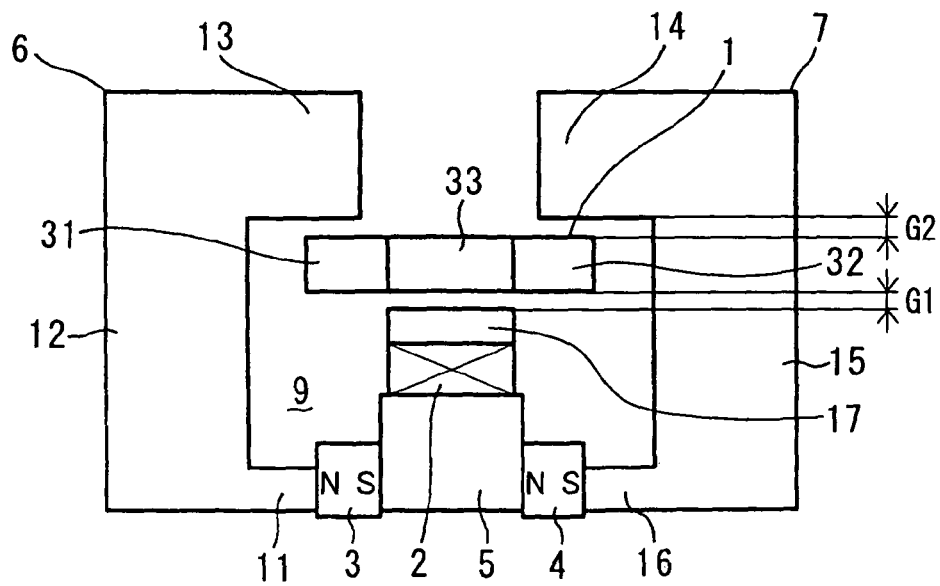
FIG. 4 is a schematic diagram illustrating a linear disposition detecting device according to the third embodiment of the invention.

A linear displacement measuring device according to the third embodiment of the invention will be described with reference to FIG. 4.

The linear displacement measuring device, like the first embodiment, includes a movable magnetic member 1 that is linked with the control shaft to move in the longitudinal direction thereof, a magnetic sensor 2 that is disposed to confront the movable magnetic member 1, a pair of first and second permanent magnets 3, 4 that is disposed to supply magnetic flux to the movable magnetic member 1 and the magnetic sensor 2, a sensor supporting block 5 and a pair of first and second yoke members 6, 7.

However, the movable magnetic member 1 is constructed of a first magnetic member 31, a second magnetic member 32 and a intermediate non-magnetic member 33 disposed between the first and second magnetic members 31, 32. Further, the magnetic sensor 2 includes a magnetic shoe member 17 disposed on the sensing surface of the sensor element.

The intermediate non-magnetic member 33 is effective to separate the first and second magnetic circuits from each other, so that more accurate sensing of the magnetic flux can be provided. The magnetic shoe member 17 is effective to increase the magnetic permeance of the sensing device, so that the size of the permanent magnets 3, 4 can be made smaller.

Figure 5:
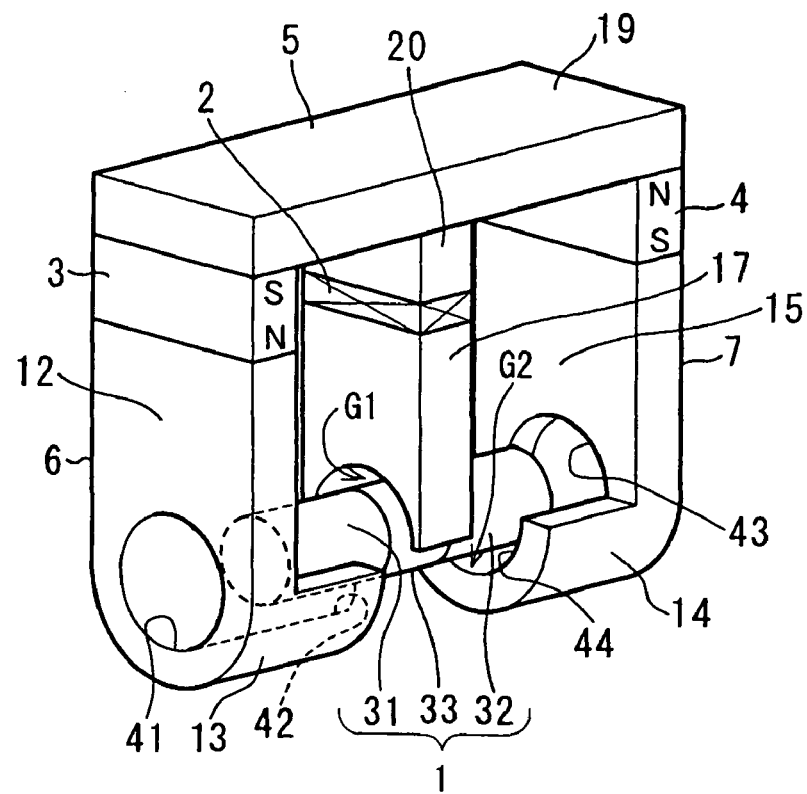
FIG. 5 is a perspective view of a linear disposition detecting device according to the fourth embodiment of the invention.

A linear displacement measuring device according to the fourth embodiment of the invention will be described with reference to FIGS. 5-7.

The linear displacement measuring device according to the fourth embodiment of the invention includes a cylindrical movable magnetic member 1 that is linked with the control shaft to move in the longitudinal direction thereof in an accommodation space, a magnetic sensor 2, a pair of first and second permanent magnets 3, 4 that is disposed to supply magnetic flux to the movable magnetic member 1 and the magnetic sensor 2, a sensor supporting yoke member 5 that has a center projection 20, a pair of first and second yoke members 6, 7. The magnetic sensor 2 includes a magnetic shoe member 17 disposed to confront the cylindrical surface of the movable magnetic member 1.

Figure 7:
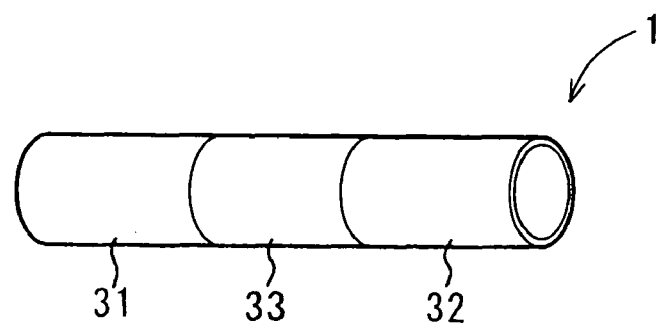
FIG. 7 is a schematic diagram illustrating a movable magnetic member of the displacement measuring device according to the fourth embodiment of the invention.

As shown in FIG. 7, the cylindrical movable magnetic member 1 is constructed of a first cylindrical magnetic member 31, a second cylindrical magnetic member 32 and an intermediate cylindrical non-magnetic member 33 disposed between the first and second magnetic members 31, 32. The first and second cylindrical magnetic members 31, 32 may be hollow members made from magnetic plates or solid members that are made from casted magnetic material or compressed magnetic powder.

If, however, the mounting space for the displacement measuring device is not severely limited, the cylindrical movable member 1 can be made of magnetic material without non-magnetic member.

The permanent magnets 3, 4 are respectively fixed to opposite ends of the sensor supporting yoke member 5. The sensor supporting yoke member 5 has a center projection 20 at the center thereof, so that the permanent magnets 3, 4 and the sensor supporting yoke member 5 form an E-shaped magnetic member that has three projections—the first permanent magnet 3, the center projection 20 and the second permanent magnet 4—and a base portion 19 that extends in parallel with the movable magnetic member 1. The sensor supporting yoke member 5, the first and second yoke members 6, 7, and the permanent magnets 3, 4 form a stationary magnetic member. The center projection 20 of the sensor supporting yoke member 5 has a cubic shape that supports the magnetic sensor 2 on its upper surface. The permanent magnets 3, 4 are magnetized in the same way as the second embodiment.

Each of the first and second yoke members 6, 7 is a magnetic member that has a semi-cylindrical projection 13, 14 extending in parallel with the longitudinal direction of the movable magnetic member 1 and a body portion 12, 15 extending in the transversal direction of the movable member 1 to magnetically connect the permanent magnet 3, 4 and the projection 13, 14. The first and second yoke members 6, 7 are disposed at opposite sides of the sensor supporting yoke member 5 so that the projections 13, 14 respectively confront each other to form the accommodation space together with the magnetic shoe member 17.

The magnetic shoe member 17 has a semi-cylindrical inside wall that confronts the cylindrical surface of the movable magnetic member 1 at a first air gap G1. Each of the body portions 12, 15 of the first and second yoke members 6, 7 has a cylindrical inside wall 41, 43 at the portion thereof where one end of the movable magnetic member (1) crosses. Each of the semi-cylindrical projections 13, 14 of the first and second yoke members 6, 7 has a semi-cylindrical inside wall 42, 44, which confronts the cylindrical surface of the movable magnetic member 1 at a second air gap G2. The cylindrical inside walls 41, 43 of the first and second yoke members 6, 7 provide a sufficient accommodation space for the movable magnetic member 1. In other words, the size of the displacement measuring device can be minimized.

Figure 3:
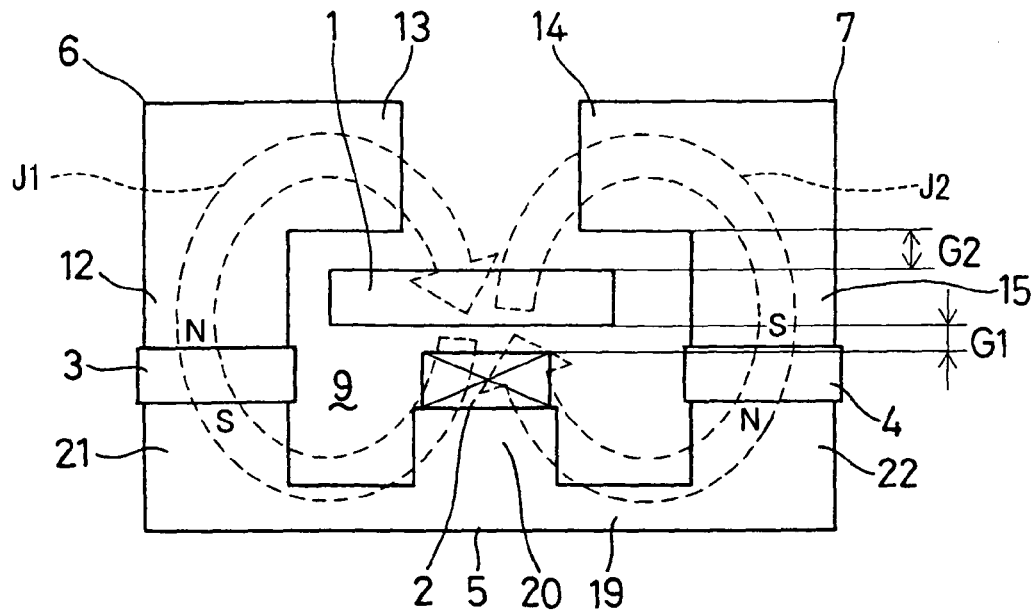
FIG. 3 is a schematic diagram illustrating a linear disposition detecting device according to the second embodiment of the invention.

Incidentally, the stationary magnetic member of this embodiment has a cross-section that is similar to the stationary magnetic member of the second embodiment shown in FIG. 3 except for the magnetic shoe member 17. Therefore, the sum of the first and second air gaps G1, G2 is not changed even if the movable magnetic member 1 shifts in any direction in the stationary magnetic member. That is, the output voltage signal of the magnetic sensor 2 does not change even if the movable magnetic member 1 shifts in any direction.

Figure 6A:
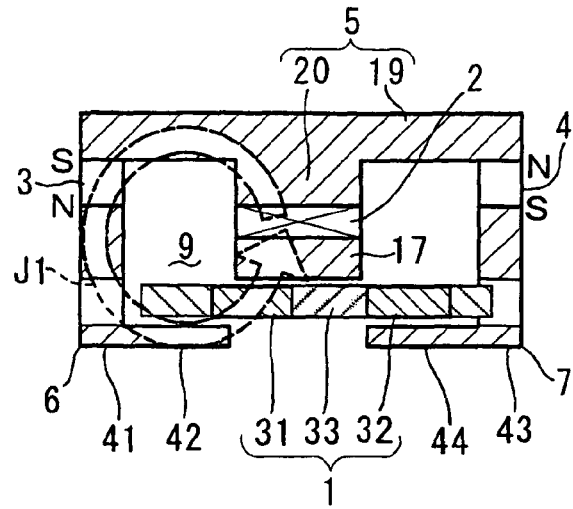
FIGS. 6A, 6B and 6C respectively illustrate the linear disposition detecting device according to the fourth embodiment of the invention when the movable magnetic member is in different positions.
Figure 6B:
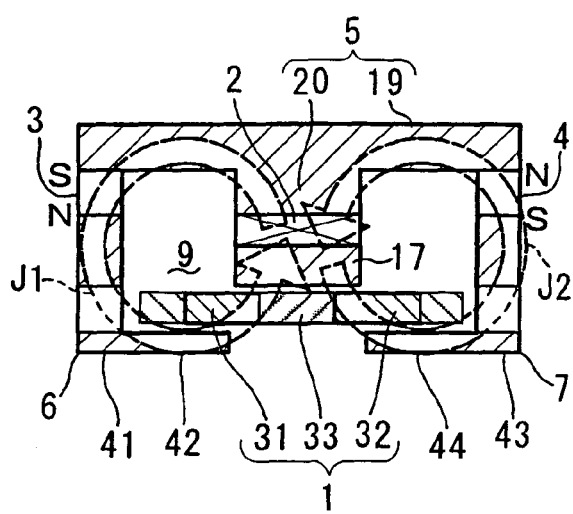
Figure 6C:
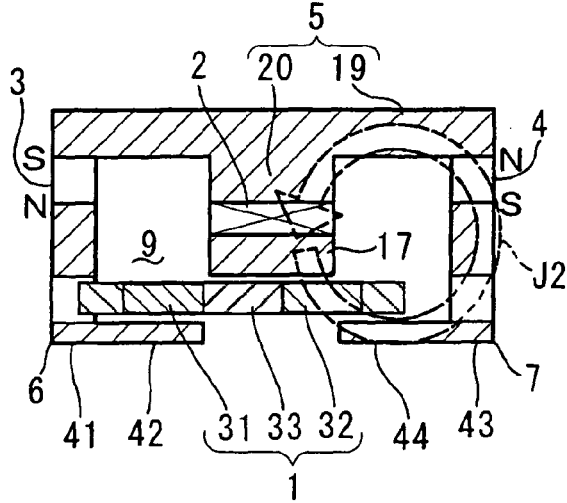

The magnetic sensor 2 outputs a voltage signal (e.g. 0.07 Tesler as shown in FIG. 2) that corresponds to its maximum amount of the magnetic flux when the movable magnetic member does not move from the position shown in FIG. 6A. On the other hand, the magnetic sensor 2 outputs a voltage signal (e.g. −0.07 Tesler as shown in FIG. 2) that corresponds to its minimum amount of the magnetic flux when the movable magnetic member 1 moves by its maximum stroke (e.g. 8 mm) to the right, as shown in FIG. 6C. When the movable magnetic member 1 is located at the middle position in the stationary member, as shown in FIG. 6B, the magnetic sensor 2 outputs a voltage signal (e.g. −0.00 T as shown in FIG. 2) that corresponds to its intermediate magnetic flux A rotation displacement measuring device according to the fifth embodiment of the invention will be described with reference to FIGS. 8 and 9.

The rotation displacement measuring device, like the third embodiment, includes an arc-shaped movable magnetic member 1 that is linked with a throttle device of an engine, a magnetic sensor 2 that is disposed to confront the movable magnetic member 1, a pair of first and second permanent magnets 3, 4 that is disposed to supply magnetic flux to the movable magnetic member 1 and the magnetic sensor 2, a sensor supporting yoke member 5 and a pair of arc-shaped first and second yoke members 6, 7. Further, the magnetic sensor 2 includes a semi-cylindrical magnetic shoe member 17 disposed on the sensing surface of the sensor element.

The sensor supporting yoke member 5 is an axisymmetric round E-shaped magnetic member that has three projections—a center projection 20, a first projection 21 and a second projection 22. The sensor supporting yoke member 5, the first and second yoke members 6, 7, and the permanent magnets 3, 4 form a stationary magnetic member. The center projection 20 of the sensor supporting yoke member 5 has a generally cubic shape that supports the magnetic sensor 2 on its surface (lower surface in FIG. 8).

Each of the first and second yoke members 6, 7 is an arc-shaped magnetic member that has an end portion 13, 14 circumferentially extending in parallel with the arc-shaped movable magnetic member 1. The first and second yoke members 6, 7 are disposed at opposite sides of the sensor supporting block 5 so that the end portions 13, 14 respectively confront each other.

Each of the first and second permanent magnets 3, 4 is disposed between one of the yoke members 6, 7 and one of the first and second projections 21, 22 of the sensor supporting yoke member 5 without an air gap. Therefore, the stationary magnetic member is formed symmetric with respect to the vertical center line of the sensor supporting yoke member 5.

The movable magnetic member 1 is accommodated in an accommodation space 9 formed between the first and second yoke members 6, 7 so that it can rotate 100° in angle, for example. For this purpose, the movable magnetic member 1 is initially disposed to be closer to the inside wall of one of the yoke members (e.g. yoke member 6), as indicated by character A than the other, as indicated by character B. The first and second permanent magnets 3, 4 are magnetized in the same manner as the first embodiment.

Accordingly, the stationary magnetic member provides a pair of first magnetic circuits each of which includes the center projection 20 and the first or second projection 21, 23 of the sensor supporting yoke member 5, the first or second permanent magnet 3, 4, the first or second yoke member 6, the second air gap G2, the movable magnetic member 1, the first air gap G1 and the magnetic sensor 2 as in the first embodiment.

When the movable magnetic member 1 rotates in one direction thereof as the throttle valve opens or closes, the magnetic permeance between the end portions 13, 14 and the movable magnetic member 1 changes, so that the amounts of the magnetic flux flowing in the first and second magnetic circuits change, in substantially the same manner as the first embodiment.

Figure 8:
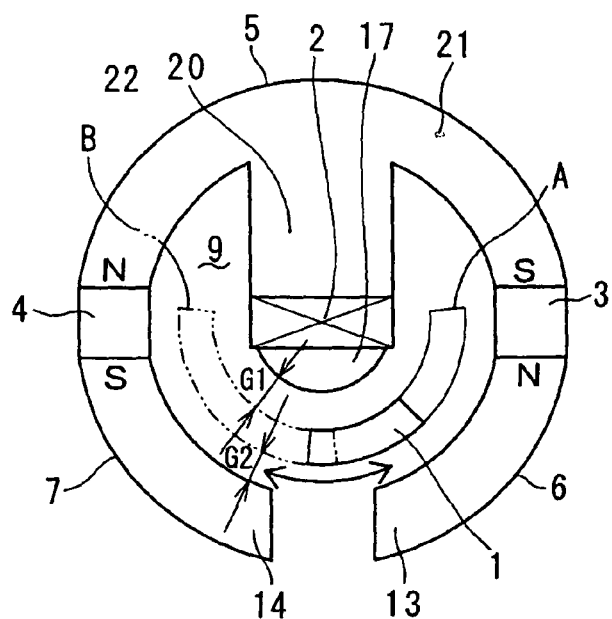
FIG. 8 is a schematic diagram illustrating a rotational displacement measuring device according to the fifth embodiment of the invention.
Figure 9:
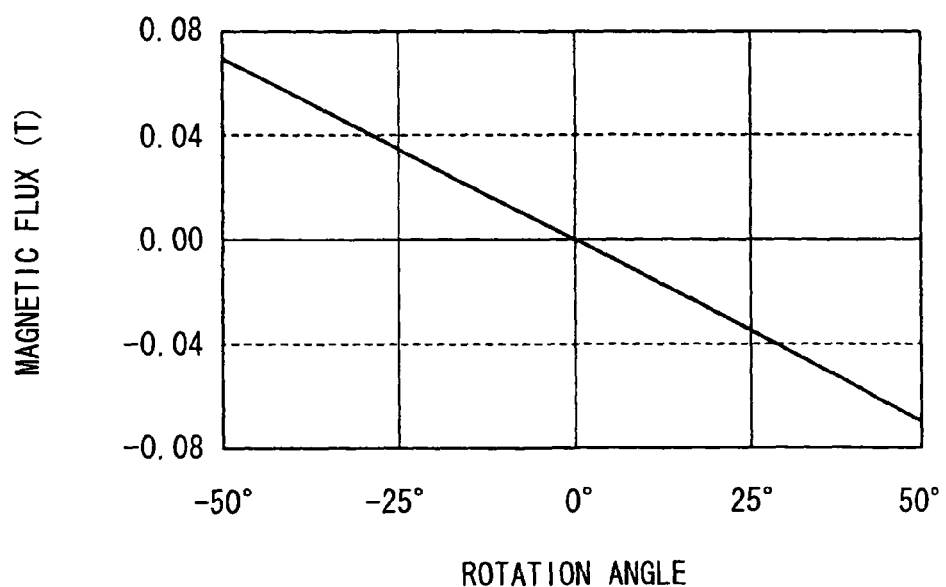
FIG. 9 is a graph showing a relation between the displacement of a movable magnetic member and an amount of magnetic flux that passes a Hall IC of the rotational disposition detecting device according to the fifth embodiment of the invention.
Figure 10:
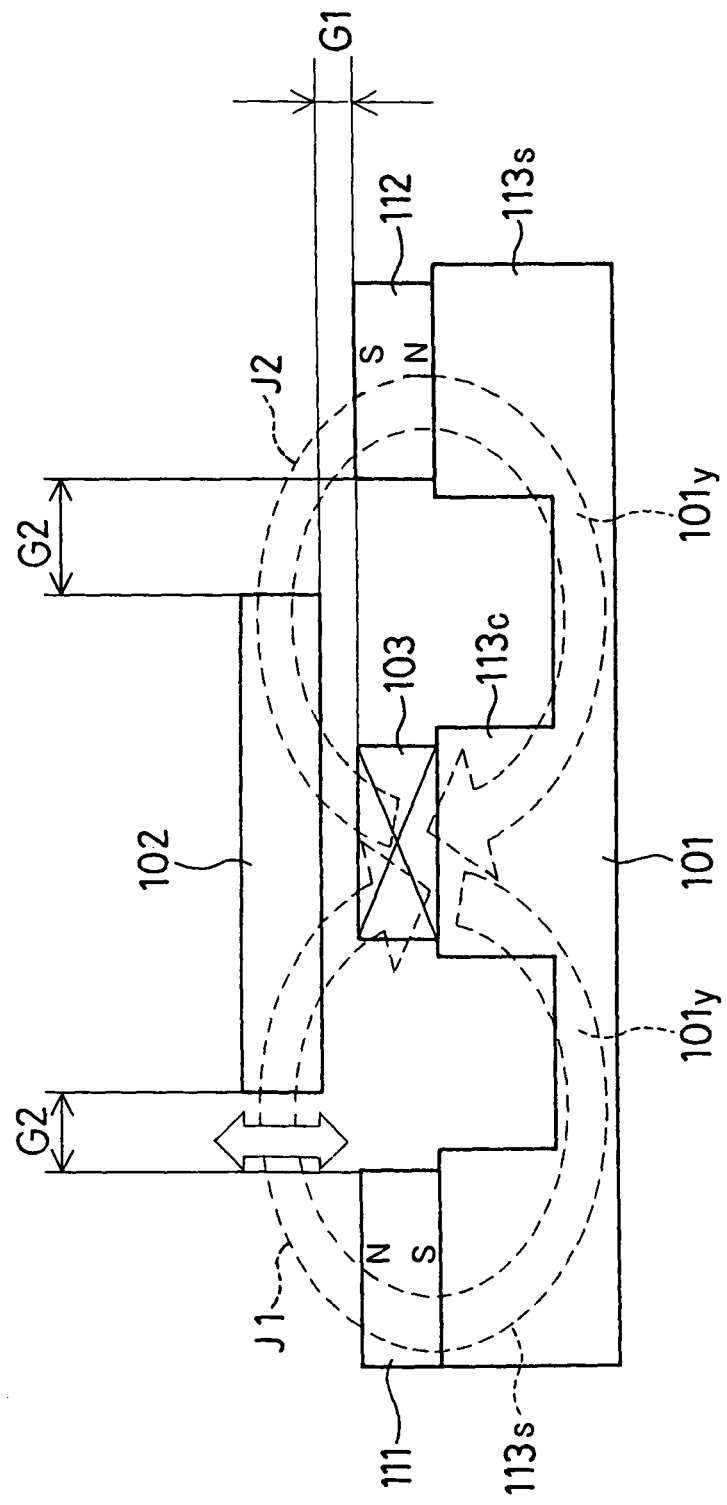
FIG. 10 is a schematic diagram of a known linear displacement measuring device.

As shown in FIG. 9, the magnetic sensor 2 outputs a voltage signal that corresponds to its maximum amount (e.g. 0.07 Tesla) of the magnetic flux when the movable magnetic member 1 does not rotates from the position (e.g. −50°) shown in FIG. 8. On the other hand, the magnetic sensor 2 outputs a voltage signal that corresponds to its minimum amount (e.g. −0.07 Tesla) of the magnetic flux when the movable magnetic member 1 rotates from the position (e.g. −50°) shown in FIG. 7 by its maximum angle (e.g. 100°) to the right (e.g. 50°).

It is noted that the voltage signal linearly changes as the movable magnetic member rotates. It is also noted that the sum of the first and second air gaps G1, G2 is not changed even if the movable magnetic member 1 shift in the radial direction in the stationary magnetic member. That is, the output voltage signal of the magnetic sensor 2 does not change even if the movable magnetic member 1 shifts in the radial direction.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims.

Accordingly, the description of the present invention is to be regarded in an illustrative, rather than a restrictive, sense.

What is claimed is:
1. A displacement measuring device comprising:
  a movable magnetic member disposed in an accommodation space having opposite sides extending in parallel with each other and linked with a moving object to move in a longitudinal direction thereof;

a magnetic sensor having a sensing surface disposed at one side of the accommodation space to confront the moving magnetic member at a first air gap thereby sensing magnetic flux;

an axisymmetric stationary magnetic member for providing the accommodation space therein, said stationary magnetic member including a sensor supporting member supporting the magnetic sensor at the center thereof, a pair of yoke members axisymmetrically disposed at opposite sides of the sensor supporting member, a pair of permanent magnets each of which is disposed between one of the yoke members and the sensor supporting member, thereby providing a pair of magnetic circuits each of which crosses the movable magnetic circuit, wherein:

the permanent magnets are polarized so that magnetic flux flows in one of the magnetic circuits is opposite in direction to magnetic flux flowing in the other magnetic circuit; and each of the yoke members has a projection having a surface extending along the other side of the accommodation space in parallel with the longitudinal surface of the movable magnetic member at a second air gap so that magnetic permeance of the first and second magnetic circuits changes when the moving magnetic member moves in the longitudinal direction.

2. A displacement measuring device as in claim 1, wherein:

the projections of the yoke members confront each other so as to partly overlap with the movable magnetic member in the longitudinal direction thereof.

3. A displacement measuring device as in claim 1, wherein the movable magnetic member is disposed to partially overlap with one of the projections.

4. A displacement measuring device as in claim 3, wherein the permanent magnets are located nearer to the magnetic sensor than to the movable magnetic member.

5. A displacement measuring device as in claim 1, wherein:

the yoke members extend in a circumferential direction; and the movable magnetic member extends in parallel with the yoke members.

6. A displacement measuring device as in claim 5, wherein the sensor member includes a magnetic shoe member to confront the movable magnetic member.

7. A displacement measuring device as in claim 1, wherein the movable magnetic member 1 comprises a non-magnetic member disposed at the central portion thereof so as to magnetically insulate one of the magnetic circuits crossing the movable magnetic member from the other.

8. A displacement measuring device comprising:

a movable magnetic member linked with a moving object to move in a circumferential direction thereof;

a magnetic sensor disposed to confront the moving magnetic member at a first air gap;

an axisymmetric stationary magnetic member including a sensor supporting member supporting the magnetic sensor disposed at the center thereof that has an axis of symmetry, a pair of yoke members disposed at opposite sides of the sensor supporting member, a pair of permanent magnets each of which is disposed between one of the yoke members and the sensor supporting member, thereby providing a pair of magnetic circuits each of which crosses the movable magnetic circuit and the magnetic sensor, wherein:

the permanent magnets are polarized so that magnetic flux flows in one of the magnetic circuits in a direction opposite to magnetic flux flowing in the other magnetic circuit; and each of the yoke members circumferentially extends in parallel with the movable magnetic member at a second air gap so that magnetic permeance of the first and second magnetic circuits changes when the moving magnetic member moves in the circumferential direction.

9. A displacement measuring device as in claim 8, wherein the magnetic sensor includes a magnetic shoe member to provide a surface that confronts the movable magnetic member at the first air gap.

10. A displacement measuring device as in claim 1, wherein the magnetic sensor includes a magnetic shoe member to provide a surface that confronts the movable magnetic member 1 at the first air gap, wherein:

the movable magnetic member has a cylindrical outside surface; and the projection of each of the yoke members has a semi-cylindrical inside surface that confronts the cylindrical outside surface of the movable magnetic member at the second air gap.

11. A displacement measuring device as in claim 10, wherein:

each of the magnetic yokes has a body portion extending in a transverse direction to magnetically connect one of the permanent magnets and one of the projections; and the body portion has a cylindrical inside wall at a portion thereof where one end of the movable magnetic member crosses.

12. A displacement measuring device as in claim 10, wherein the movable magnetic member comprises a pair of cylindrical magnetic members disposed at opposite ends thereof and a cylindrical non-magnetic member disposed between the cylindrical magnetic members.

13. A displacement measuring device comprising:

a stationary magnetic member including a sensor supporting member disposed in line with an axis of symmetry, a pair of yoke members axisymmetrically disposed at opposite sides of the sensor supporting member, a pair of permanent magnets each of which is disposed between one of the yoke members and the sensor supporting member, thereby providing an accommodation space surrounded by the yoke members and the sensor supporting member and a pair of magnetic circuits each of which crosses the accommodation space;

a movable magnetic member linked with a moving object and disposed in the accommodation space to move in its longitudinal direction within the accommodation space;

a magnetic sensor, disposed on the sensor supporting member to confront a the moving magnetic member at a first air gap, for sensing magnetic flux flowing in the first and second magnetic circuits wherein:

the permanent magnets are polarized so that magnetic flux flows in one of the magnetic circuits in a direction opposite to magnetic flux flowing in the other magnetic circuit; and each of the yoke members has a projection extending in parallel with the longitudinal direction of the movable magnetic member at a second air gap, whereby magnetic permeance of the first and second magnetic circuits changes when the moving magnetic member moves in the longitudinal direction thereof.

14. A displacement measuring device as in claim 13, wherein the magnetic sensor includes a magnetic shoe to provide a surface that confronts the movable magnetic member 1 at the first air gap, wherein:

the movable magnetic member has a cylindrical outside surface; and the projection of each of the yoke members has a semi-cylindrical inside surface that confronts the cylindrical outside surface of the movable magnetic member at the second air gap.

15. A displacement measuring device as in claim 14, wherein:

each of the magnetic yokes has a body portion for magnetically connecting one of the permanent magnets and one of the projections; and the body portion has a cylindrical inside wall at a portion thereof where one end of the movable magnetic member crosses, thereby providing an additional accommodation space of the movable magnetic member.

16. A displacement measuring device as in claim 15, wherein the movable magnetic member comprises a pair of cylindrical magnetic members disposed at opposite ends thereof and a cylindrical non-magnetic member disposed between the cylindrical magnetic members.

17. A displacement measuring device comprising:

an axisymmetric stationary magnetic member for forming a generally rectangular accommodation space having longitudinal opposite ends and opposite sides therein;

a magnetic sensor; and a linear movable magnetic member linked with a moving object and disposed in the accommodation space so that the movable member can move in its longitudinal direction and in parallel with the sides of the accommodation space;

wherein:

the stationary magnetic member includes a sensor supporting member whose center axis being disposed at an axis of symmetry to support the magnetic sensor so that a sensing surface of the magnetic sensor can be disposed at one side of the accommodation space to extend in parallel with longitudinal direction of the movable magnetic member at a first air gap, a first magnetic circuit member magnetically connected with the sensor supporting member and having a first projection extending from one end of the accommodation space along the opposite side of the accommodation space to be in parallel with the longitudinal direction of movable magnetic member at a second air gap and a first permanent magnet for providing the first magnetic circuit member with magnetic flux flowing in one direction, a second magnetic circuit member, magnetically connected with the sensor supporting member and having a second projection extending from the other end of the accommodation space along the opposite side of the accommodation space to be in parallel with the longitudinal direction of movable magnetic member at the second air gap and a second permanent magnet for providing the second magnetic circuit member with magnetic flux flowing in the other direction;

each of the first and second projections has a surface that confronts the movable magnetic member, whereby the surface area changes when the movable magnetic member moves in the longitudinal direction thereof.

18. A displacement measuring device as in claim 17, wherein the magnetic sensor includes a magnetic shoe member to provide a surface that confronts the movable magnetic member 1, wherein:

the movable magnetic member has a cylindrical outside surface; and the projection of each of the yoke members has a semi-cylindrical inside surface that confronts the cylindrical outside surface of the movable magnetic member.

19. A displacement measuring device as in claim 18, wherein:

each of the magnetic circuit member has a body portion for magnetically connecting one of the permanent magnets and one of the projections; and the body portion has a cylindrical inside wall at a portion thereof where one end of the movable magnetic member crosses, thereby providing an additional accommodation space of the movable magnetic member.

20. A displacement measuring device as in claim 19, wherein the movable magnetic member comprises a pair of cylindrical magnetic members disposed at opposite ends thereof and a cylindrical non-magnetic member disposed between the cylindrical magnetic members.

* * * * *